United States Patent
van den Berg et al.

(10) Patent No.: US 6,548,617 B2
(45) Date of Patent: Apr. 15, 2003

(54) COATING COMPOSITION COMPRISING A BICYCLO-ORTHOESTER-FUNCTIONAL COMPOUND, AN ISOCYANATE-FUNCTIONAL COMPOUND, AND A THIOL-FUNCTIONAL COMPOUND

(75) Inventors: Keimpe Jan van den Berg, Sassenheim (NL); Judith Johanna Maria Adriana Loenen, Alphen a/d Rijn (NL); Frederik Rous, Amsterdam (NL); Huig Klinkenberg, Katwijk aan Zee (NL); Eric Gerardus Johanus Oude Spraakste, Alphen a/d Rijn (NL); Arie Noomen, Voorhout (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/997,885

(22) Filed: Nov. 30, 2001

(65) Prior Publication Data

US 2002/0123600 A1 Sep. 5, 2002

Related U.S. Application Data

(60) Provisional application No. 60/261,125, filed on Jan. 12, 2001.

(30) Foreign Application Priority Data

Nov. 30, 2000 (EP) ............................................ 00204261
Apr. 6, 2001 (EP) ............................................ 01201274

(51) Int. Cl.⁷ ................................................ C08G 18/28
(52) U.S. Cl. .............................. 528/73; 528/74; 528/85
(58) Field of Search .............................. 528/73, 85, 74

(56) References Cited

U.S. PATENT DOCUMENTS

| 4,338,240 A | 7/1982 | Mizutani et al. ............. 524/284 |
| 4,788,083 A | 11/1988 | Dammann et al. .......... 427/340 |
| 5,973,098 A | 10/1999 | Keita et al. .................... 528/65 |

FOREIGN PATENT DOCUMENTS

| WO | 97/31073 | 8/1997 | ......... C09D/175/04 |
| WO | 99/10397 | 3/1999 | ........... C08G/18/00 |

Primary Examiner—Rachel Gorr
(74) Attorney, Agent, or Firm—Joan M. McGillycuddy

(57) ABSTRACT

The invention pertains to a coating composition comprising
  a) a first compound comprising at least one bicyclo-orthoester group,
  b) a second compound comprising at least two isocyanate groups, and
  c) a third compound comprising at least one thiol group.

The invention also relates to a process for curing the present coating composition. More particularly, the latent hydroxyl groups of the bicyclo-orthoester groups have to be deblocked and reacted with the isocyanate-groups of the second compound if the present coating composition is to be cured.

20 Claims, 1 Drawing Sheet

COATING COMPOSITION COMPRISING A BICYCLO-ORTHOESTER-FUNCTIONAL COMPOUND, AN ISOCYANATE-FUNCTIONAL COMPOUND, AND A THIOL-FUNCTIONAL COMPOUND

This application claims priority of European Patent Application No. 00204261.2 filed Nov. 30, 2001, European Patent Application No. 01201274.6 filed on Apr. 6, 2000, and U.S. Provisional Application Ser. No. 60/261,125 filed Jan. 12, 2001.

FIELD OF INVENTION

The invention pertains to a coating composition comprising a first compound comprising at least one bicyclo-orthoester group and a second compound comprising at least two isocyanate groups.

The above-mentioned coating composition is known from WO 97/31073. It has been found that with the application of such a coating composition as a clear coat on certain substrates foam formation is observed at relatively low film thickness.

SUMMARY OF INVENTION

The invention now provides a coating composition of the aforementioned type which is free of said drawback. For that reason the coating composition mentioned in the opening paragraph is wherein the it comprises a third compound comprising at least one thiol group.

BACKGROUND OF INVENTION

The use of thiol-functional compounds in the coating composition of the present invention provides coatings with little or no foam formation and a film thickness up to at least about 60 μm without film defects. Such a layer thickness of at least about 60 μm will result in characteristics which, as known to a person skilled in the art, are preferred for a clear coat, such as good protection of the underlying coating layer(s), gloss, hardness. Furthermore, coating compositions according to the present invention show a low VOC, a favourable pot life:drying time ratio, reduced sagging of the coating composition on the substrate, and a high build behaviour.

A coating composition comprising a compound comprising at least one bicyclo-orthoester group (bicyclo-orthoester hereinafter is abbreviated to BOE) is a composition having latent hydroxyl groups. In the presence of water or moisture from the air the BOE groups will be hydrolysed, forming hydroxyl groups. This reaction is also known as deblocking. During deblocking few if any volatile components are released. When the BOE group is deblocked in this manner, it is not possible to obtain a homopolymer of BOE groups by cationic polymerisation. However, the deblocked hydroxyl groups can react with the isocyanate groups of the second compound to give a cross-linked polymer.

U.S. Pat. No. 4,788,083 discloses a coating composition comprising a polyol polyisocyanate mixture and a molar excess of a thiol-functional compound to a tin catalyst. By molar excess is meant that sufficient thiol-functional compound is added to the tin catalyst for the pot life in an open can of the polyol polyisocyanate mixture to be at least twice as long as for the same mixture containing only the tin catalyst.

DETAILED DESCRIPTION OF THE INVENTION

Figure 1:
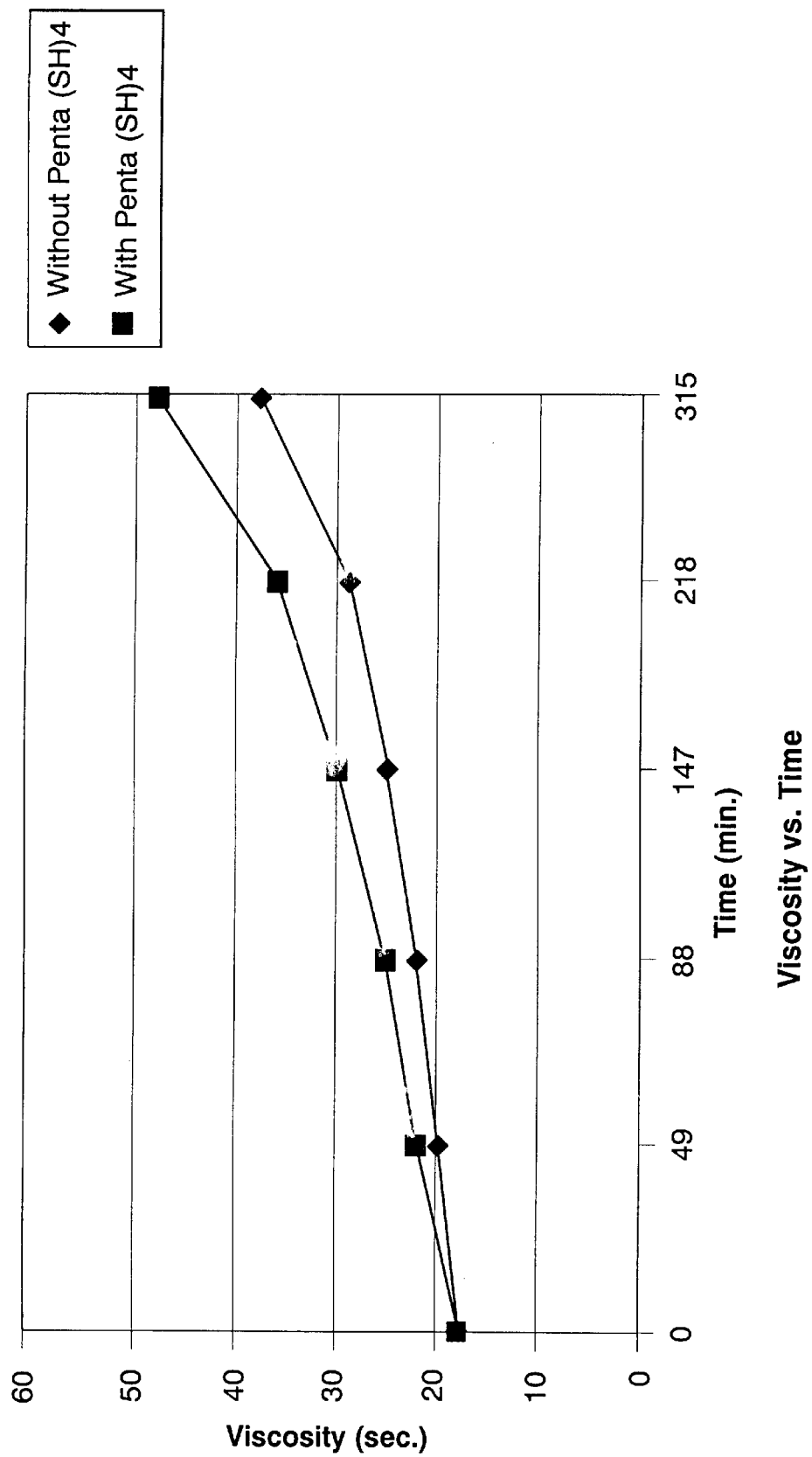
FIG. 1 is a viscosity versus time graph for the clear coat formulations in Table 10 (below).

Surprisingly, it has been found that the presence of a thiol-functional compound in the coating composition of the present invention does not increase the pot life at all, but in fact decreases it. Furthermore, the curing rate of the coating composition of the present invention is the same as of a coating composition which does not comprise a thiol-functional compound. Still, a decrease of the foam formation is observed when using the coating composition of the present invention.

By BOE groups are meant groups having a structure according to formula I

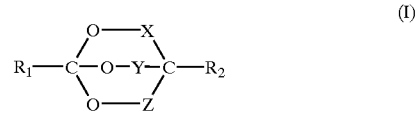

(I)

wherein the

X and Z may be the same or different and are selected from linear or branched alk(en)ylene groups with 1–4 carbon atoms optionally containing an oxygen or a nitrogen atom;

Y is nothing or is selected independently of X and Z from linear or branched alk(en)ylene groups with 1–4 carbon atoms optionally containing an oxygen or a nitrogen atom;

$R_1$ and $R_2$ may be the same or different and are selected from the group of monovalent radicals comprising hydrogen, hydroxyl, alk(en)yl groups comprising 1–30 carbon atoms which groups may be linear or branched and may optionally contain one or more heteroatoms and groups selected from the group of oxygen, nitrogen, sulphur, phosphorus, sulphone, sulphoxy, and ester, optionally substituted with epoxy, cyano, amino, thiol, hydroxyl, halogen, nitro, phosphorus, sulphoxy, amido, ether, ester, urea, urethane, thioester, thioamide, amide, carboxyl, carbonyl, aryl, and acyl groups, and divalent radicals comprising alk(en)ylene groups having 1–10 carbon atoms which groups may be linear or branched and may optionally contain one or more heteroatoms and groups selected from the group of oxygen, nitrogen, sulphur, phosphorus, sulphone, sulphoxy, and ester, optionally substituted with epoxy, cyano, amino, thiol, hydroxyl, halogen, nitro, phosphorus, sulphoxy, amido, ether, ester, urea, urethane, thioester, thioamide, amide, carboxyl, carbonyl, aryl, and acyl groups; ester groups; ether groups; amide groups; thioester groups; thioamide groups; urethane groups; urea groups; and a single bond.

Preferably, X, Y, and Z are methylene. $R_1$ and $R_2$ in that case are linked to a divalent 2,6,7-trioxabicyclo[2.2.2]octane radical.

In the case of $R_1$ and $R_2$ both being monovalent radicals, the BOE group as defined by formula I is the same as the BOE-functional compound. The monovalent radicals $R_1$ and $R_2$ may be the same or different and preferably are selected from the group of hydrogen, hydroxyl, and linear or branched alk(en)yl groups having 1–20 carbon atoms, optionally substituted with one or more hydroxyl groups and optionally comprising an ester group. Examples of such groups are: methyl, methylol, ethyl, ethylol, propyl, propylol, butyl, pentyl, hexyl, heptyl, octyl, nonyl, decyl, undecyl, a —$CH_2$—$CH_2$—O—CO—$C_{1-20}$ alk(en)yl group, and mixtures thereof.

Preferably, $R_1$ is linear or branched alk(en)yl having 1–20 carbon atoms, optionally substituted with hydroxyl, while $R_2$ is methyl or ethyl. Alternatively, $R_1$ can be methyl, ethyl, propyl, butyl, pentyl, hexyl, heptyl, octyl, nonyl, decyl, undecyl, and mixtures thereof, while $R_2$ can be methylol, ethyl, ethylol or a —$CH_2$—$CH_2$—O—CO—$C_{1-20}$ alk(en)yl group.

When a divalent radical is selected for either or both $R_1$ or $R_2$ groups, high-molecular weight BOE-functional compounds can be formed. These may be adducts or polymers comprising several BOE groups. Thus two BOE groups can form an adduct by the selection of a monovalent radical for one of the two $R_1$ and $R_2$ groups and a divalent radical for the other. The BOE groups will then be linked together via the divalent radical. BOE groups may also be linked via the divalent radicals to monomer or oligomer compounds. Such BOE-functional compounds are described, e.g., in the above-mentioned U.S. Pat. No. 4,338,240. For example, two BOE groups may be linked to a dimer fatty acid, e.g., Pripol 1009 ex Unichema. Alternatively, in the aforementioned configuration the BOE groups can function as side groups or terminal groups in a polymer chain. The polymers can be, e.g., polyesters, polyethers, polyacrylates, polyamides or polyurethanes. When the divalent radical is a single bond, the BOE group is bonded directly to the polymer. When the $R_1$ and $R_2$ groups are both divalent, the BOE groups can be incorporated into the main chain of a polymer or they can serve to link two polymer chains together. Preferably, one or both $R_1$ and $R_2$ groups are selected from the group of ester, ether, urethane, a single bond, and alk(en)ylene groups having 1–10 carbon atoms which may be linear or branched and may contain one or more ester, ether, or urethane groups.

In addition to the BOE-functional compound the coating composition according to the invention comprises a second compound comprising at least two isocyanate groups. Examples of compounds comprising at least two isocyanate groups are aliphatic, alicyclic, and aromatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 2,4-trimethyl hexamethylene diisocyanate, 2,4,4-trimethyl hexamethylene diisocyanate, dodecamethylene diisocyanate, α,α'-dipropyl ether diisocyanate, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, m- and p-phenylene diisocyanate, 1,3- and 1,4-bis(isocyanate methyl)benzene, 1,5-dimethyl-2,4-bis (isocyanate methyl)benzene, 1,3,5-triisocyanate benzene, 2,4- and 2,6-toluene diisocyanate, 2,4,6-toluene triisocyanate, α,α,α',α'-tetramethyl o-, m-, and p-xylylene diisocyanate, 4,4'-diphenylene diisocyanate methane, 4,4'-diphenylene diisocyanate, 3,3'-dichloro-4,4'-diphenylene diisocyanate, naphthalene-1,5-diisocyanate, isophorone diisocyanate, and transvinylidene diisocyanate and mixtures of the aforementioned polyisocyanates.

Also, such compounds may be adducts of polyisocyanates, e.g., biurets, isocyanurates, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate, available from Bayer under the trade designations Desmodur® N3390 and Desmodur® N3600, the uretdione of hexamethylene diisocyanate, available from Bayer under the trade designation Desmodur® N3400, the allophanate of hexamethylene diisocyanate, available from Bayer under the trade designation Desmodur® LS 2101, and the isocyanurate of isophorone diisocyanate, available from Hüls under the trade designation Vestanat® T1890E. Furthermore, (co)polymers of isocyanate-functional monomers such as α,α'-dimethyl-m-isopropenyl benzyl isocyanate are suitable for use. Finally, the above-mentioned isocyanates and adducts thereof may be present in the form of blocked isocyanates, as is known to the skilled man.

In addition to the BOE-functional compound and the polyisocyanate compound the coating composition according to the invention comprises a third compound comprising at least one thiol group. Preferably, the thiol-functional compound comprises at least two thiol groups. Besides the thiol group the third compound may also contain other reactive groups, for instance hydroxyl and carboxyl groups. Thiol-functional compounds are described in U.S. Pat. No. 4,788,083, which is incorporated herein by reference. Examples of the third compound comprising at least one thiol group include dodecyl mercaptane, mercapto ethanol, 1,3-propanedithiol, 1,6-hexanedithiol, methylthioglycolate, 2-mercaptoacetic acid, esters of 2-mercaptoacetic acid, 3-mercaptopropionic acid, esters of 3-mercaptopropionic acid, 2-mercaptopropionic acid, esters of 2-mercaptopropionic acid, 11-mercaptoundecanoic acid, and esters of 11-mercaptoundecanoic acid. The esters can be derived from all types of hydroxyl-functional compounds, oligomers, and polymers. Preferably, trimethylol propane tri(3-mercaptopropionate) and pentaerythritol tetrakis(3-mercaptopropionate) are used.

Alternatively, the compound comprising at least one thiol group may for example have a structure according to the following formula: T[($C_3H_6O$)$_n$$CH_2$CHOHCH$_2$SH]$_3$, with T being a triol such as trimethylol propane-or glycerol and n being 1–100. An example of such a compound is commercially available from Cognis under the trademark Capcure® 3/800.

The thiol-functional compound is used in an amount of 0.1 to 10 wt. %, preferably 0.5 to 5 wt. %, more preferably in an amount of 1 to 3 wt. %, calculated on the BOE-functional compound.

In addition to the disclosed BOE-functional, isocyanate-functional, and thiol-functional compounds, other compounds may be present in the coating composition according to the present invention. Such compounds may be main binders and/or reactive diluents comprising reactive groups which may be cross-linked with the aforesaid hydroxyl-functional, thiol-functional and/or isocyanate-functional compounds. Examples include hydroxyl-functional binders, e.g., polyester polyols such as described in H. Wagner et al., Lackkunstharze, 5th ed., 1971 (Carl Hanser Verlag, Munich), polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be present. Finally, ketone resins, aspargyl acid esters, and latent or non-latent amino-functional compounds such as oxazolidines, ketimines, aldimines, diimines, secondary amines, and polyamines may be present. These and other compounds are known to the skilled person and are mentioned, int. al., in U.S. Pat. No. 5,214,086.

The ratio of isocyanate groups to hydroxyl and thiol groups ranges from 50 to 300 eq. %, preferably from 70 to 250 eq. %

The invention further encompasses a process for curing the present coating composition. More particularly, the latent hydroxyl groups of the BOE-functional compound have to be deblocked and the resulting hydroxyl groups and the thiol groups already present have to react with the isocyanate groups of the second compound to allow the present coating composition to be cured.

The deblocking of the latent hydroxyl groups of the BOE compounds takes place under the influence of water in the form of, e.g., moisture from the air or added water. This deblocking is preferably catalysed by a first catalyst selected from the group of Lewis acids, such as $AlCl_3$, $SbCl_5$, $BF_3$, $BCl_3$, $BeCl_2$, $FeCl_3$, $FeBr_3$, $SnCl_4$, $TiCl_4$, $ZnCl_2$, and $ZrCl_4$ and organic complexes thereof, e.g., $BF_3Et_2O$, $BF_3$-$2CH_3COOH$, $BF_3$-$2H_2O$, $BF_3$-$H_3PO_4$, $BF_3$-$(CH_3)_2O$, $BF_3$-THF, $BF_3$-$2C_2H_5OH$, and $BF_3$-$C_6H_5CH_2$, and Brønsted acids. Preferably, use is made of Brønsted acids having a pKa<3, such as a mono- or dialkyl phosphate, a carboxylic acid having at least one chlorine and/or fluorine atom, an alkyl or aryl sulphonic acid or an (alkyl)phosphoric acid, more particularly, methane sulphonic acid, paratoluene sulphonic acid, optionally substituted naphthalene sulphonic acids, dodecyl benzene sulphonic acid, dibutyl phosphate, trichloroacetic acid, phosphoric acid, and mixtures thereof.

Said first catalysts may be blocked, if so desired, resulting in the release of the Lewis or Brønsted acid under the influence of, e.g., electromagnetic irradiation (light or UV), heat or moisture. Acid generating photoinitiators are described, int. al., in G. Li Bassi et al., "Photoinitiators for the Simultaneous Generation of Free Radicals and Acid Hardening Catalysts," Radcure '86 Proceedings, e.g., 2-methyl-1-[4-(methylthio)phenyl]-2-[4-methylphenylsulphonyl] propan-1-one. (MDTA) ex Fratelli Lamberti Spa, Varese, Italy. Alternatively, use may be made of Lewis acid generating compounds such as Irgacure® 261 ex Ciba Geigy and trimethyl silyl benzene sulphonic ester.

The first catalyst can be used alone or as a mixture of catalysts in effective amounts. In principle, the hydrolysation of at least a portion of the BOE-functional compound will suffice. Amounts of 0 to 10 wt. % relative to the BOE-functional compounds of the first catalyst may be sufficient. Preferably, 0.3 to 8 wt. %, more specifically, 0.5 to 6 wt. %, will be present.

The reaction of the deblocked hydroxyl groups of the BOE-functional compound, the isocyanate groups of the second compound, and the thiol groups of the third compound preferably takes place under the influence of a second catalyst. Such catalysts are known to the skilled person. The second catalyst is used in an amount of 0 to 10 wt. %, preferably 0.001 to 5 wt. %, more preferably in an amount of 0.01 to 1 wt. %, calculated on solid matter (i.e., the amount of BOE-functional compound, the isocyanate-functional compound, the thiol-functional compound, and optionally other compounds having reactive groups).

Examples of the second catalyst include dimethyl tin dilaurate, dibutyl tin dilaurate, dibutyl tin diacetate, tin octoate, zinc octoate, aluminium chelate, and dimethyl tin dichloride.

The coating composition according to the invention may be part of a components system, for instance a three-component system may be employed. For example, one component may comprise the BOE-functional compound and the thiol-functional compound. A second component may comprise the isocyanate-functional compound. A third component may comprise the catalyst for the hydrolysis of the BOE-functional compound. Preferably, the first component also comprises the catalyst for the reaction between the isocyanate and the isocyanate-reactive groups.

More preferred is a three-component system wherein the a first component may comprise the BOE-functional compound, a second component may comprise the isocyanate-functional compound, and a third component may comprise the catalyst for the hydrolysis of the BOE-functional compound and the thiol-functional compound. Preferably, the first component also comprises the catalyst for the reaction between the isocyanate and the isocyanate-reactive groups.

Alternatively, the coating composition can be part of a four-component system wherein the a first component may comprise the BOE-functional compound, a second component may comprise the isocyanate-functional compound, a third component may comprise the catalyst for the hydrolysis of the BOE-functional compound, and a fourth component comprises the thiol-functional compound. The catalyst for the reaction between the isocyanate and the isocyanate-reactive groups may be present in the first, second, third or fourth component.

In addition, a coating composition such as described may contain the usual additives such as solvents, pigments, fillers, levelling agents, emulsifiers, anti-foaming agents and rheology control agents, reducing agents, antioxidants, HALS-stabilisers, UV-stabilisers, water traps such as molecular sieves, and antisettling agents.

Application onto a substrate can be via any method known to the skilled person, e.g., via rolling, spraying, brushing, flow coating, dipping, and roller coating. Preferably, a coating composition such as described is applied by spraying.

The coating composition of the present invention may be applied to any substrate. The substrate may be, for example, metal, e.g., iron, steel, and aluminium, plastic, wood, glass, synthetic material, paper, leather, or another coating layer. The other coating layer may be comprised of the coating composition of the current invention or it may be a different coating composition. The coating compositions of the current invention show particular utility as clear coats (over base coats, water borne and solvent borne), base coats, pigmented topcoats, primers, and fillers. The compositions are particularly suitable for refinishing motor vehicles and transportation vehicles and for finishing large transportation vehicles such as trains, trucks, buses, and aeroplanes.

The applied coating composition can be cured very effectively at a temperature of, e.g., 0–50° C. If so desired, the coating composition may be baked, e.g., at a temperature in the range of 50–120° C.

Preferred is the use of the coating composition of the present invention as a clear coat. Clear coats must be highly transparent and have good adherence to the base coat layer. It is further required that the clear coat does not change the aesthetic aspect of the base coat by strike-in, i.e. discolouration of the base coat due to its solvation by the clear coat composition, or by yellowing of the clear coat upon outdoor exposure. A clear coat based on the coating composition of the present invention does not have these drawbacks.

If the coating composition is a clear coat, the base coat may be a conventional base coat known in the coating art. Examples are solvent borne base coats, e.g., Autobase® ex Akzo Nobel Car Refinishes BV, and water borne base coats, e.g., Autowave® ex Akzo Nobel Car Refinishes BV. Furthermore, the base coat may comprise pigments (colour pigments, metallics and/or pearls), wax, solvents, flow additives, neutralising agent, and defoamers. Also high solids base coats can be used. These are, for instance, based on polyols, imines, and isocyanates. The clear coat composition is applied to the surface of a base coat and then cured. An intermediate curing step for the base coat may be introduced.

The invention will be elucidated further with reference to the following examples.

EXAMPLES

In the examples the following abbreviations are used:

| | |
|---|---|
| pentaerythritol tetrakis(3-mercaptopropionate) | PENTA(SH)$_4$ |
| trimethylol propane tris(3-mercaptopropionate) | TMPTMP |
| dibutyl tin dilaurate | DBTL |
| dodecyl benzene sulphonic acid | DDBSA |
| ethoxyethyl propionate | EEP |
| ethoxyethyl propionate/Solvesso 100 | EEP/S |

In the examples the following compounds are used.

Byk 300, Byk 322, Byk 331, Byk 344, and Byk 390 are flow additives, ex Byk Chemie.

Nacure 5076 is 70% DDBSA in isopropanol, ex King Industries.

BOE is 4-ethyl-1-(C5$_{11}$ alkyl)-2,6,7-trioxabicyclo[2.2.2]octane prepared in accordance with WO 97/31073, Example 6.

Capcure® 3/800 is a thiol-functional compound, ex Cognis.

Tinuvin 1130 is a UV stabiliser, ex Ciba-Geigy.

Tinuvin 123 is a HALS stabiliser, ex Ciba-Geigy.

Solvesso 100 is a blend of aromatic solvents, ex Exxon.

Desmodur® N3300 is an aliphatic polyisocyanate based on the isocyanurate of hexamethylene diisocyanate, ex Bayer.

Vestanat® T1890E is a cycloaliphatic polyisocyanate based on the isocyanurate of isophorone diisocyanate, ex Hüls.

Unless otherwise stated, the properties of the coating compositions and the resulting films are measured as follows.

The viscosity is measured in a DIN flow cup number 4 in accordance with DIN 53211-1987. The viscosity is reported in seconds.

The dry layer thickness is measured in accordance with ISO 2808.

Examples 1–20 and Comparative Examples A–J

Three-component clear coat formulations 1 and 2 and Comparative formulation A (C.F.A.) were prepared as listed in Table 1, all weights are given in grams. The thiol-functional compound is present in the first component.

TABLE 1

Clear coat formulations

| | Compound | Form. 1 | Form. 2 | C.F.A |
|---|---|---|---|---|
| 1 | BOE | 62.40 | 62.93 | 63.73 |
| | Tinuvin 123 | 0.28 | — | — |
| | Tinuvin 1130 | 0.55 | — | — |
| | DBTL (10% in butyl acetate/xylene (1/1)) | 6.29 | 6.34 | 6.42 |
| | EEP/S (1/1) | 16.07 | 16.20 | 16.41 |
| | EEP | 2.64 | 2.65 | 2.69 |
| | t.-butanol (70% in butyl acetate) | 7.18 | 7.24 | 7.33 |
| | Byk 344 (10% in EEP/S (1/1)) | 2.39 | 2.41 | 2.44 |
| | Byk 390 (10% in EEP/S (1/1)) | 0.96 | 0.97 | 0.98 |
| | PENTA(SH)$_4$ | 1.24 | 1.26 | — |
| 2 | Desmodur ® N3300 | 99.50 | 99.50 | 99.50 |
| | Vestanat ® T1890 E | 78.60 | 78.60 | 78.60 |
| | Butyl acetate | 5.50 | 5.50 | 5.50 |
| | EEP | 10.90 | 10.90 | 10.90 |
| | Solvesso 100 | 5.50 | 5.50 | 5.50 |
| 3 | Nacure 5076 | 2.00 | 2.00 | 2.00 |

The clear coats had a similar spraying viscosity (18 sec.) and were applied with an HPLV spray gun (Devilbiss 1.3, nozzle 110, 2.5 bar) over several coloured water borne base coats (Autowave®) which were dried for at least 15 minutes. The clear coats were applied in layers of increasing thickness. The clear coats were dried for 10 minutes at 60° C. The compositions of the water borne base coats based on commercially available Autowave® toners are listed in Tables 2A and 2B (weights are given in grams). The results for the obtained clear coats are summarised in Table 3. Foam characteristics are established by determining the minimum layer thickness of the clear coat at which foam appears. This was determined visually.

TABLE 2 A

Autowave ® base coat formulations

| Toners | Yellow NISER3 | Silver Beige VOL324 | Rouge Vallelunga P1607:87 | Rio Verde OP369 | Moondust Silver FEU9352 |
|---|---|---|---|---|---|
| 099 | | 9.31 | 9.04 | | 1.19 |
| 101 | | 355.53 | | | |
| 242 | | 78.59 | | 53.15 | |
| 253 | | | 353.85 | | |
| 296 | 84.23 | | | | |
| 332GA | 79.98 | | | 72.53 | |
| 333C | 41.05 | 42.01 | | | |
| 333CC | | | | | 101.30 |
| 333DF | | 14.93 | | | |
| 333EC | | | | | 28.90 |
| 333PB | | | | | |
| 333PG | 106.61 | | | 157.24 | |
| 333PR | | | | | |
| 334WB | | | | | |
| 335 | | | | | |
| 341 | | | | | |
| 358 | | | 346.02 | | |
| 379 | | | | 252.28 | |
| 527 | | | | | |
| 533 | | | | | |
| 537 | | | | | |
| 568 | | | | | |
| 575 | | | | | |
| 579 | 181.22 | | | 44.11 | |
| 665 | 287.09 | 398.93 | | | 781.86 |
| 744 | 11.19 | | | | |

TABLE 2 A-continued

Autowave ® base coat formulations

| Toners | Yellow NISER3 | Silver Beige VOL324 | Rouge Vallelunga P1607:87 | Rio Verde OP369 | Moondust Silver FEU9352 |
|---|---|---|---|---|---|
| 777 | 133.24 | | | | |
| 952 | | 21.83 | | 343.08 | 4.13 |
| 955 | | | 222.58 | | |
| 971 | | | | | |
| Demi-water | | | | | |
| TOTAL | 924.62 | 921.12 | 931.49 | 922.40 | 917.39 |

TABLE 2 B

Autowave ® base coat formulations

| Toners | Ming Blue AULZ5L | Marseille Red OP549:91 | Diamond White FEU411 | Kiruna Violet BMW4684 | Jet Black BMW9932 |
|---|---|---|---|---|---|
| 099 | | | 1039.72 | | |
| 101 | | | | 111.21 | |
| 242 | 639.28 | 266.75 | | 243.79 | 801.07 |
| 253 | | | | | |
| 296 | | | | | |
| 332GA | | | | | |
| 333C | 0.46 | | | | |
| 333CC | | | | | |
| 333DF | | | | | |
| 333EC | | | | | |
| 333PB | 68.63 | | | | |
| 333PG | | 58.29 | | | |
| 333PR | | 233.44 | | | |
| 334WB | | | | 265.63 | |
| 335 | | 13.13 | | | |
| 341 | 110.19 | | | | |
| 358 | | | | | |
| 379 | | | 2.12 | | |
| 527 | | 244.73 | | | |
| 533 | | | | | 106.55 |
| 537 | | 60.23 | | | |
| 568 | | | 3.71 | | |
| 575 | | | | 12.49 | |
| 579 | | | | | |
| 665 | 3.1 | | | | |
| 744 | | | | 221.87 | |
| 777 | | | | | |
| 952 | | | | | |
| 955 | 89.78 | 61.44 | | | |
| 971 | | | | 69.95 | |
| Demi-water | | | 50 | | |
| TOTAL | 911.43 | 924.87 | 1108.67 | 924.93 | 907.62 |

TABLE 3

Foam detection in base coat (BC)/clear coat (CC) systems

| | Colour | CC | L. th. BC (μm) | L. th. CC (μm) | Min. l. th. |
|---|---|---|---|---|---|
| A | Diamond White FEU411 | C.F.A | 31 | 21–272 | 46 |
| 1 | | Form. 1 | 27 | 12–176 | no foam |
| 2 | | Form. 2 | 26 | 11–206 | no foam |
| B | Jet Black BMW9932 | C.F.A | 25 | 25–276 | 34 |
| 3 | | Form. 1 | 21 | 14–202 | no foam |
| 4 | | Form. 2 | 23 | 12–196 | 83 |
| C | Kiruna Violet BMW4684 | C.F.A | 23 | 17–281 | 31 |
| 5 | | Form. 1 | 22 | 14–216 | 80 |
| 6 | | Form. 2 | 27 | 16–210 | no foam |
| D | Marseille Red OP549:91 | C.F.A | 21 | 13–266 | 35 |
| 7 | | Form. 1 | 30 | 10–179 | 145 |
| 8 | | Form. 2 | 24 | 16–203 | 149 |
| E | Ming Blue AULZ5L | C.F.A | 25 | 26–252 | 41 |
| 9 | | Form. 1 | 24 | 21–161 | 144 |
| 10 | | Form. 2 | 20 | 24–178 | 94 |
| F | Moondust Silver FEU9352 | C.F.A | 30 | 12–283 | 38 |
| 11 | | Form. 1 | 29 | 10–188 | 135 |
| 12 | | Form. 2 | 32 | 13–191 | 146 |
| G | Rio Verde OP369 | C.F.A | 27 | 20–278 | 36 |
| 13 | | Form. 1 | 35 | 15–199 | 85 |
| 14 | | Form. 2 | 38 | 24–173 | 90 |
| H | Rouge Vallelunga P1607:87 | C.F.A | 18 | 20–275 | 43 |
| 15 | | Form. 1 | 27 | 17–172 | 135 |
| 16 | | Form. 2 | 26 | 18–169 | 86 |
| I | Silver Beige VOL324 | C.F.A | 29 | 27–237 | 41 |
| 17 | | Form. 1 | 30 | 17–167 | 90 |
| 18 | | Form. 2 | 31 | 26–196 | 79 |
| J | Yellow NISER3 | C.F.A | 24 | 16–247 | 46 |
| 19 | | Form. 1 | 30 | 19–162 | 75 |
| 20 | | Form. 2 | 33 | 16–203 | 77 |

L. th. = layer thickness
Min. l. th. = minimum layer thickness where foam appearance is established These results clearly show that the addition of PENTA $(SA)_4$ to the clear coat formulation decreases the susceptibility to foam formation of that clear coat over a broad range of base coat colours. HALS and UV stabilisers do not influence the susceptibility to foam formation. All clear coats were sufficiently cured after 10 minutes at 60° C. and showed good solvent resistance properties.

Examples 21–24 and Comparative Examples K–N

Three-component clear coat formulation 3 and Comparative formulation B (C.F.B.) were prepared as listed in Table 4, all weights are given in grams. The thiol-functional compound is present in the first component.

TABLE 4

Clear coat formulations

| | Compound | Form. 3 | C.F.B |
|---|---|---|---|
| 1 | BOE | 64.35 | 65.18 |
| | Tinuvin 123 | 0.29 | 0.29 |
| | Tinuvin 1130 | 0.57 | 0.58 |
| | Byk 322 | 0.57 | 0.58 |
| | DBTL (10% in butyl acetate/xylene (1/1)) | 6.49 | 6.57 |
| | EEP/S (1/1) | 16.56 | 16.78 |
| | Byk 331 (10% in EEP) | 1.19 | 1.21 |
| | EEP | 8.70 | 8.82 |
| | PENTA$(SH)_4$ | 1.28 | — |
| 2 | Desmodur ® N3300 | 99.50 | 99.50 |
| | Vestanat ® T1890 E | 78.60 | 78.60 |
| | Butyl acetate | 5.50 | 5.50 |
| | EEP | 10.90 | 10.90 |
| | Solvesso 100 | 5.50 | 5.50 |
| 3 | Nacure 5076 | 2.00 | 2.00 |

The clear coats were sprayed over a water borne base coat, Autowave®, and a solvent borne base coat, Autobase®, both prepared in the colour Peugeot 1607:87 (Rouge Vallelunga), in the same manner as described in Example 1. The results are summarised in Table 5.

TABLE 5

Foam detection in base coat (BC)/clear coat (CC) systems

|    | BC       | CC      | L. th. BC ($\mu$m) | L. th. CC ($\mu$m) | Min. l. th. |
|----|----------|---------|--------------------|--------------------|-------------|
| K  | Autobase | C.F.A   | 26–31              | 14–255             | 42          |
| L  |          | C.F.B   | 18–27              | 14–220             | 37          |
| 21 |          | Form. 2 | 23–32              | 8–224              | No foam     |
| 22 |          | Form. 3 | 28–32              | 8–185              | No foam     |
| M  | Autowave | C.F.A   | 32–36              | 18–197             | 42          |
| N  |          | C.F.B   | 32–36              | 20–210             | 35          |
| 23 |          | Form. 2 | 27–37              | 21–231             | 96          |
| 24 |          | Form. 3 | 25–38              | 11–240             | 75          |

This experiment clearly shows that the minimum layer thickness at which foam formation occurs has shifted from about 40 $\mu$m to at least 75 $\mu$m upon the addition of PENTA(SH)$_4$ and is independent of the used base coat. All clear coats were sufficiently cured after 10 minutes at 60° C. and showed good solvent resistance properties.

Examples 25 and 26

Three-component clear coat formulations 4 and 5 were prepared as listed in Table 6, all weights are given in grams. Instead of PENTA(SH)$_4$, TMPTMP was used in the first component.

TABLE 6

Clear coat formulations

|   | Compound | Form. 4 | Form. 5 |
|---|----------|---------|---------|
| 1 | BOE | 62.33 | 62.40 |
|   | Tinuvin 123 | 0.28 | 0.28 |
|   | Tinuvin 1130 | 0.55 | 0.55 |
|   | DBTL (10% in butyl acetatelxylene (1/1)) | 6.28 | 6.29 |
|   | EEP/S(1/1) | 16.05 | 16.07 |
|   | EEP | 2.63 | 2.64 |
|   | t.-butanol (70% in butyl acetate) | 7.17 | 7.18 |
|   | Byk 344 (10% in EEP/S (1/1)) | 2.39 | 2.39 |
|   | Byk 390 (10% in EEP/S (1/1)) | 0.96 | 0.96 |
|   | TMPTMP | 1.36 | 1.24 |
| 2 | Desmodur ® N3300 | 99.50 | 99.50 |
|   | Vestanat ® T1890 E | 78.60 | 78.60 |
|   | Butyl acetate | 5.50 | 5.50 |
|   | EEP | 10.90 | 10.90 |
|   | Solvesso 100 | 5.50 | 5.50 |
| 3 | Nacure 5076 | 2.00 | 2.00 |

Clear coat formulations 4 and 5 were sprayed over a water borne base coat, Autowave®, colour Peugeot 1607:87 (Rouge Vallelunga), in the same manner as described in Example 1. The results are summarised in Table 7.

TABLE 7

Foam detection in base coat (BC)/clear coat (CC) systems

| Ex. | CC | L. th BC ($\mu$m) | L. th. CC ($\mu$m) | Min. L. th. |
|-----|----|-------------------|--------------------|-------------|
| 25  | 4  | 16                | 30–93              | 64          |
| 26  | 5  | 19                | 19–85              | 62          |

These results clearly show that addition of TMPTMP to the clear coat formulation decreases the susceptibility to foam formation of that clear coat.

Example 27

A three-component clear coat formulation 6 was prepared as listed in Table 8, all weights are given in grams. Instead of PENTA(SH)$_4$, Capcure® 3/800 was used in the first component.

TABLE 8

Clear coat formulation

|   | Compound | Form. 6 |
|---|----------|---------|
| 1 | BOE | 63.92 |
|   | Tinuvin 123 | 0.30 |
|   | Tinuvin 1130 | 0.60 |
|   | DBTL (10% in butyl acetatelxylene (1/1)) | 7.69 |
|   | Solvesso 100 | 8.22 |
|   | EEP | 7.65 |
|   | t.-butanol (70% in butyl acetate) | 7.36 |
|   | Byk 344 (10 % in EEP/S (1/1)) | 2.20 |
|   | Byk 390 (10 % in EEP/S (1/1)) | 0.91 |
|   | Capcure ® 3/800 | 2.82 |
| 2 | Desmodur ® N3300 | 99.50 |
|   | Vestanat ® T1890 E | 78.60 |
|   | Butyl acetate | 5.50 |
|   | EEP | 10.90 |
|   | Solvesso 100 | 5.50 |
| 3 | Nacure 5076 | 2.00 |

Clear coat formulation 6 was sprayed over a water borne base coat, Autowave®, colour Peugeot 1607:87 (Rouge Vallelunga), in the same manner as described in Example 1. The minimum layer thickness where foam was established was 100$\mu$.

Examples 28 and 29

Three-component clear coat formulation 7 and a four-component clear coat formulation 8 were prepared as listed in Table 9, all weights are given in grams. Capcure® 3/800 was used in the third and fourth components, respectively.

TABLE 9

Clear coat formulation

|   | Compound | Form. 7 | Form. 8 |
|---|----------|---------|---------|
| 1 | BOE | 63.9 | 63.9 |
|   | EEP | 7.1 | 7.1 |
|   | DBTL (10% in butyl acetate/xylene (1/1)) | 10.9 | 10.9 |
|   | Tinuvin 1130 | 0.6 | 0.6 |
|   | Tinuvin 123 | 0.3 | 0.3 |
|   | Butyl acetate | 5.4 | 5.4 |
|   | Methoxy propyl acetate | 3.6 | 8.8 |
|   | Isopropanol | 5.2 | — |
|   | Byk 344 (10% in EEP/S (1/1)) | 1 | 1 |
|   | Byk 300 (10% in EEP/S (1/1)) | 1 | 1 |
|   | Byk 390 (10% in EEP/S (1/1)) | 1 | 1 |
| 2 | Desmodur ® N3300 | 99.5 | 99.5 |
|   | Vestanat ® T1890 E | 78.6 | 78.6 |
|   | Butyl acetate | 5.5 | 5.5 |
|   | EEP | 10.9 | 10.9 |
|   | Solvesso 100 | 5.5 | 5.5 |
| 3 | Nacure 5076 | 2.0 | 2.0 |
|   | Capcure ® 3/800 | 1.6 | — |
|   | Isopropanol | 0.4 | — |
| 4 | Capcure ® 3/800 | — | 2.5 |
|   | Butyl acetate | — | 1.5 |

Clear coat formulations 7 and 8 were sprayed over a water borne base coat, Autowave®, colour Daimler Benz 744, in the same manner as described in Example 1. The minimum layer thickness where foam was established was 100 $\mu$m.

Example 30 and Comparative Example O

Three-component clear coat formulation 9 and Comparative clear coat formulation C (C.F.C.) were prepared as listed in Table 10, all weights are given in grams. The thiol-functional compound is present in the first component.

TABLE 10

Clear coat formulations

| | Compound | Form. 9 | C.F.C |
|---|---|---|---|
| 1 | BOE | 64.35 | 65.18 |
| | Tinuvin 123 | 0.29 | 0.29 |
| | Tinuvin 1130 | 0.57 | 0.58 |
| | Byk 322 | 0.57 | 0.58 |
| | DBTL (10% in butylacetate/xylene (1/1)) | 6.49 | 6.57 |
| | EEP/S (1/1) | 16.56 | 16.78 |
| | Byk 331 (10% in EEP) | 1.19 | 1.21 |
| | EEP | 8.70 | 8.82 |
| | PENTA(SH)$_4$ | 1.28 | — |
| 2 | Desmodur ® N3300 | 99.50 | 99.50 |
| | Vestanat ® T1890 E | 78.60 | 78.60 |
| | Butyl acetate | 5.50 | 5.50 |
| | EEP | 10.90 | 10.90 |
| | Solvesso 100 | 5.50 | 5.50 |
| 3 | Nacure 5076 | 2.50 | 2.50 |

The pot life of clear coat formulations 9 and C as listed in Table 10 was followed over time in an open can. The results are plotted in a viscosity versus time graph, as shown in FIG. 1.

Surprisingly, the graph in FIG. 1 shows that instead of being increased as is suggested by U.S. Pat. No. 4,788,083, the pot life of the coating composition of the present invention is significantly reduced.

What is claimed is:

1. A coating composition comprising
    a) a first compound comprising at least one bicyclo-orthoester group,
    b) a second compound comprising at least two isocyanate groups, and
    c) a third compound comprising at least one thiol group.

2. A coating composition according to claim 1, wherein the bicyclo-orthoester group has a structure according to formula I

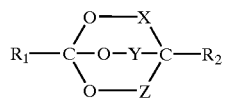

(I)

wherein
    X and Z may be the same or different and are selected from linear or branched alk(en)ylene groups with 1–4 carbon atoms optionally containing an oxygen or a nitrogen atom;
    Y is nothing or is selected independently of X and Z from linear or branched alk(en)ylene groups with 1–4 carbon atoms optionally containing an oxygen or a nitrogen atom;
    R$_1$ and R$_2$ may be the same or different and are selected from the group of monovalent radicals comprising hydrogen, hydroxyl, alk(en)yl groups comprising 1–30 carbon atoms which groups may be linear or branched and may optionally contain one or more heteroatoms and groups selected from the group of oxygen, nitrogen, sulphur, phosphorus, sulphone, sulphoxy, and ester, optionally substituted with epoxy, cyano, amino, thiol, hydroxyl, halogen, nitro, phosphorus, sulphoxy, amido, ether, ester, urea, urethane, thioester, thioamide, carboxyl, carbonyl, aryl, and acyl groups, and divalent radicals comprising alk(en)ylene groups having 1–10 carbon atoms which groups may be linear or branched and may optionally contain one or more heteroatoms and groups selected from the group of oxygen, nitrogen, sulphur, phosphorus, sulphone, sulphoxy, and ester, optionally substituted with epoxy, cyano, amino, thiol, hydroxyl, halogen, nitro, phosphorus, sulphoxy, amido, ether, ester, urea, urethane, thioester, thioamide, amide, carboxyl, carbonyl, aryl, and acyl groups, ester groups; ether groups; amide groups; thioester groups; thioamide groups; urethane groups; urea groups; and a single bond.

3. A coating composition according to claim 2 wherein X, Y, and Z are methylene.

4. A coating composition according to claim 2, wherein in the case of their being monovalent radicals, R$_1$ and R$_2$ may be the same or different and are selected from the group of hydrogen, hydroxyl, and linear or branched alk(en)yl groups having 1–20 carbon atoms, optionally substituted with one or more hydroxyl groups and optionally containing an ester group.

5. A coating composition according to claim 4, wherein the R$_1$ and R$_2$ may be the same or different and are selected from the group of methyl, methylol, ethyl, ethylol, propyl, propylol, butyl, pentyl, hexyl, heptyl, octyl, nonyl, decyl, undecyl, and a —CH$_2$—CH$_2$—O—CO—C$_{1-20}$ alk(en)yl group.

6. A coating composition according to claim 1, wherein the isocyanate-functional compound is selected from the group of biurets, isocyanurates, allophanates, uretdiones, and mixtures thereof.

7. A coating composition according to claim 1, wherein the thiol-functional compound has at least two thiol groups.

8. A coating composition according to claim 7, wherein the thiol-functional compound is selected from pentaerythritol tetrakis(3-mercaptopropionate), trimethylol propane tris(3-mercaptopropionate), and T[(C$_3$H$_6$O)$_n$CH$_2$CHOHCH$_2$SH]$_3$, with T being a triol and n being 1–100.

9. A coating composition according to claim 1, wherein the thiol-functional compound is used in an amount of 0.1 to 10 wt. %, calculated on the bicycloorthoester-functional compound.

10. A process for curing a coating composition according to claim 1, wherein the latent hydroxyl groups of the bicyclo-orthoester groups are deblocked in the presence of water, optionally in the presence of a first catalyst, and that the resulting hydroxyl groups and the thiol groups present are reacted with the isocyanate groups of the second compound, optionally in the presence of a second catalyst.

11. A process according to claim 10, wherein the first catalyst is selected from the group of Lewis acids and Brønsted acids.

12. A process according to claim 11, wherein the Brønsted acid is selected from the group of a mono- or dialkyl phosphate, a carboxylic acid having at least one chlorine and/or fluorine atom, an alkyl or aryl sulphonic acid or an (alkyl)phosphoric acid.

13. A process according to claim 12, wherein the Brønsted acid is selected from the group of methane sulphonic acid, paratoluene sulphonic acid, optionally substituted naphthalene sulphonic acids, dodecyl benzene sulphonic acid, dibutyl phosphate, trichloroacetic acid, phosphoric acid, and mixtures thereof.

14. A process according to claim 10, wherein use is made of 0 to 10 wt. % of the first catalyst, calculated on bicycloorthoester-functional compounds.

15. A process according to claim 14, wherein use is made of 0.3 to 8 wt. % of the first catalyst.

16. A process according to claim 10, wherein the second catalyst is selected from the group of dimethyl tin dilaurate, dibutyl tin dilaurate, dibutyl tin diacetate, tin octoate, zinc octoate, aluminium chelate, dimethyl tin dichloride, and mixtures thereof.

17. A process according to claim 16, wherein the second catalyst is present in an amount of 0.001 to 5 wt. %, calculated on solid matter.

18. A three-component system, wherein a first component comprises at least one bicyclo-orthoester compound and the thiol-functional compound, a second component comprises at least one isocyanate-functional compound, and a third component comprises a first catalyst for the hydrolysis of the bicyclo-orthoester compound.

19. A three-component system wherein a first component comprises at least one bicyclo-orthoester compound, a second component comprises at least one isocyanate-functional compound, and a third component comprises a first catalyst for the hydrolysis of the bicyclo-orthoester compound and at least one thiol-functional compound.

20. A four-component system, wherein a first component comprises at least one bicyclo-orthoester compound, a second component comprises at least one isocyanate-functional compound, a third component comprises a first catalyst for the hydrolysis of the bicyclo-orthoester compound, and a fourth component comprises the thiol-functional compound.

* * * * *